United States Patent
Wilder

[15] 3,652,387
[45] *Mar. 28, 1972

[54] PROCESS FOR THE MANUFACTURE OF DISSOLVING-GRADE PULP

[72] Inventor: Harry D. Wilder, Midlothian, Va.
[73] Assignee: Ethyl Corporation, New York, N.Y.
[ * ] Notice: The portion of the term of this patent subsequent to Nov. 3, 1987, has been disclaimed.
[22] Filed: Dec. 31, 1969
[21] Appl. No.: 889,661

Related U.S. Application Data

[63] Continuation-in-part of Ser. No. 797,209, Feb. 6, 1969, abandoned, and a continuation-in-part of Ser. No. 830,709, June 5, 1969.

[52] U.S. Cl..................................162/25, 162/66, 162/67, 162/89
[51] Int. Cl..........................................D21c 9/14
[58] Field of Search.................162/19, 24, 66, 67, 88, 89, 162/236, 25

[56] References Cited

UNITED STATES PATENTS

| | | | |
|---|---|---|---|
| 2,422,522 | 6/1947 | Beveridge et al. | 162/24 X |
| 2,878,118 | 3/1959 | Rogers et al. | 162/89 X |
| 2,882,965 | 4/1959 | Wayman et al. | 162/89 |
| 3,446,699 | 5/1969 | Asplund et al. | 162/19 |

*Primary Examiner*—S. Leon Bashore
*Assistant Examiner*—Thomas G. Scavone
*Attorney*—Donald L. Johnson and David L. Ray

[57] ABSTRACT

Vegetable matter is treated to produce a dissolving-grade pulp, including mechanical refining of the raw material followed by, first, a lignin reaction treatment with chlorine dioxide or chlorine and chlorine dioxide and, second, an extraction treatment with a strong alkali solution such as 50 to 60 grams alkali per liter.

10 Claims, 6 Drawing Figures

PROCESS FOR THE MANUFACTURE OF DISSOLVING-GRADE PULP

This application is a continuation-in-part of application Ser. No. 797,209, filed Feb. 6, 1969, now U.S. Pat. No. 3,591,451, and application Ser. No. 830,709, filed June 5, 1969, now pending.

BACKGROUND OF THE INVENTION

Wood and the stems of other vascular plants such as reed, bamboo, cane, and the like, which are or can be subjected to pulping, are composed of several basic parts. In general, such plants are made up of about 15 to 30 percent lignins and extractives, such as resins and the like, with the remainder of the about 70 to 80 percent being carbohydrates. The carbohydrate portion is about 10 to 30 percent hemicellulose with the remainder being cellulose, and the cellulose portion of the carbohydrate is about 45 to 55 percent alpha cellulose and about 5 percent other celluloses.

One of the first steps in converting chips of such fibrous plants to pulp is to loosen and disintegrate the material structure by removing most of the lignins therefrom and separating the remaining carbohydrate fibers into individual fibers. In all known pulping processes, such as kraft, sulfite and others, when efforts are made through rigorous conditions to remove substantially all of the lignin from the fiber mass, the remaining cellulose fibers are chemically and/or mechanically damaged. This results in a significant loss of yield and a major reduction in product molecular weight or degree of polymerization. On the other hand, use of milder conditions to avoid fiber damage results in retention of both lignin and hemicellulose, which cannot be tolerated in dissolving-grade pulps. Thus, the present invention is directed to removing substantially all of the lignin and hemicellulose while minimizing cellulose loss and chemical degradation.

SUMMARY OF THE INVENTION

This invention is directed toward a new and novel pulping process and the dissolving-grade pulp resulting therefrom. The pulp process removes substantially only lignins, extractives, and hemicellulose from fibrous plant materials and leaves the cellulose part of the material substantially undamaged, thereby resulting in dissolving-grade pulp having new and unusual properties. Since the pulping process is very selective and substantially only the lignins, extractives, and hemicellulose are removed, yields are exceptionally high. The pulping process includes a basic unit of a chloride dioxide treatment and alkaline extraction which may be sequentially repeated, this basic unit being preceded by a chemical and/or mechanical pretreatment of the fiber chips which may in turn be preceded by acid prehydrolysis. The last alkaline extraction of the sequence is stronger than other alkaline extractions (in any) in order to remove hemicellulose. Each step of the basic sequential unit is desirably followed by water washing with process liquids obtained elsewhere in the process, as by countercurrent washing which has attendant conservation advantages, or with fresh water. Alkali may also be conserved by similar countercurrent recycle.

A more preferred embodiment of the process is one including an acid prehydrolysis and a chemical and/or mechanical pretreatment of prepared fiber chips along with refining at elevated temperature and pressure followed by the sequential processing of the pretreated-refined chips in a chlorine dioxide treatment, a dilute alkaline extraction, a chlorine dioxide treatment, a strong alkaline extraction and a final chlorine dioxide treatment, with each of these stages being followed by water washing.

An even more preferred embodiment of the process is one in which a water wash for the final chlorine dioxide treatment is used as the water wash for the preceding alkaline extraction and so on countercurrently to the flow of fiber material through the process to the first water wash following the first chlorine dioxide treatment; from this point the wash water may then be sent to waste or treated for recovery of chemicals contained therein.

Another preferred embodiment of the process involves the chemical pretreatment of prepared fiber chips; the most preferred chemical pretreatment is a neutral sulfite pretreatment at a specified concentration of chemicals and cooking cycle.

Yet another preferred embodiment is one wherein the liquid from a press-wash which follows the strong alkaline extraction stage is circulated to both the strong and dilute alkaline extractions.

The pulp produced by the process of the present invention has a higher degree of polymerization, a higher alpha cellulose content, a lower resin content, a lower carbonyl content, and a higher yield than conventionally produced dissolving-grade pulps from the same wood mixture.

BRIEF DESCRIPTION OF THE DRAWINGS

In the drawings, FIG. 1 describes the basic process of this invention. FIG. 2 shows a more preferred embodiment of the process of this invention, and FIGS. 3 and 4 disclose highly preferred embodiments of the process of this invention. FIG. 5 shows a comparison of pentosan content of the dissolving pulp with caustic concentration in pulp slurry; FIG. 6 shows a comparison of average degree of polymerization with caustic concentration.

DESCRIPTION OF THE PREFERRED EMBODIMENTS

Figure 1:
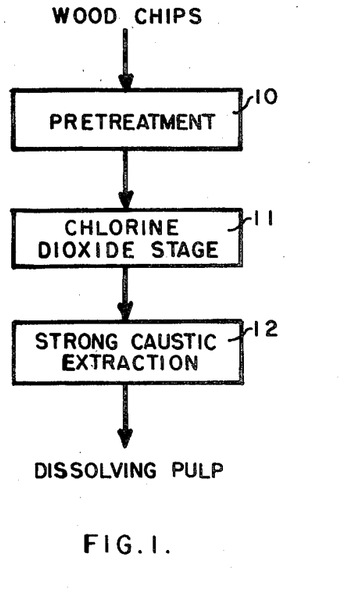
FIGS. 1 to 4 are block diagrams and FIGS. 5 and 6 are graphs.

Referring now to FIG. 1, fiber chips of any fibrous vegetable matter are fed first to a pretreatment step 10 which may be either mechanical, chemical or any combinations thereof. If a chemical pretreatment is used, it is followed by a water wash. Following pretreatment, the pretreated chips are then fed to a lignin reaction treatment 11 where they are contacted with either chlorine dioxide or a mixture of chlorine dioxide and chlorine in either aqueous solution or as a gas. Following this, the treated material is preferably washed with water to return the mixture to substantially neutral pH; then the treated material is subjected to strong alkaline extraction 12 and again washed with water to return to substantially neutral pH and to remove the water soluble materials produced in the extraction step. This produces a pulp in high yield of good brightness, high degree of polymerization, a high alpha cellulose content, a very low resin content, and a very low carbonyl content.

Figure 2:
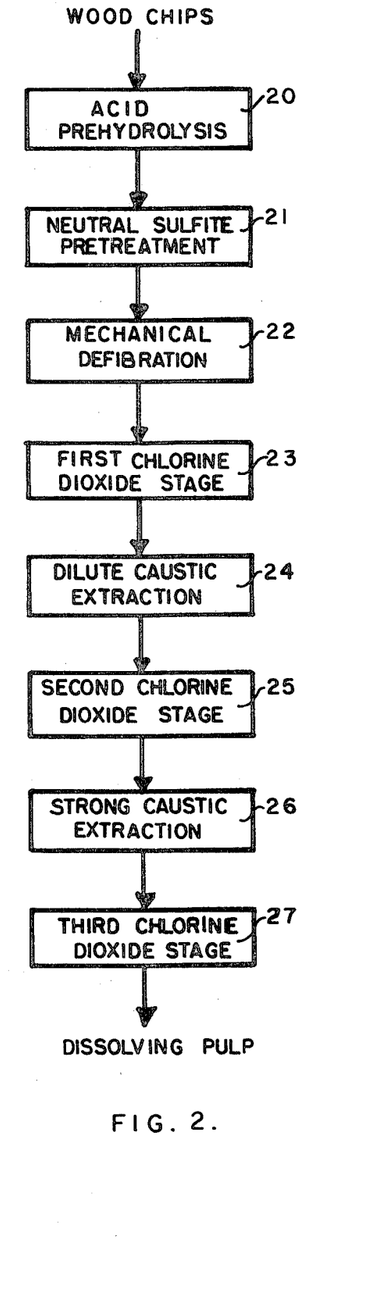

Referring now to FIG. 2, a more preferred embodiment of the invention is shown. Prepared vegetable fiber chips are fed to an acid prehydrolysis 20 and then to pretreatments 21 and 22 where they are subjected to chemical, mechanical or combined chemical-mechanical operations to make the lignin, extractives and hemicellulose more readily available for removal. Following acid prehydrolysis and pretreatment, the pulp is subjected sequentially to a lignin reaction treatment 23, dilute alkaline extraction 24, lignin reaction treatment 25, strong alkaline extraction 26, and final lignin reaction treatment 27. Water washing preferably occurs after the prehydrolysis and chemical pretreatment stages, as well as after each lignin reaction stage and alkaline extraction stage.

Figure 3:
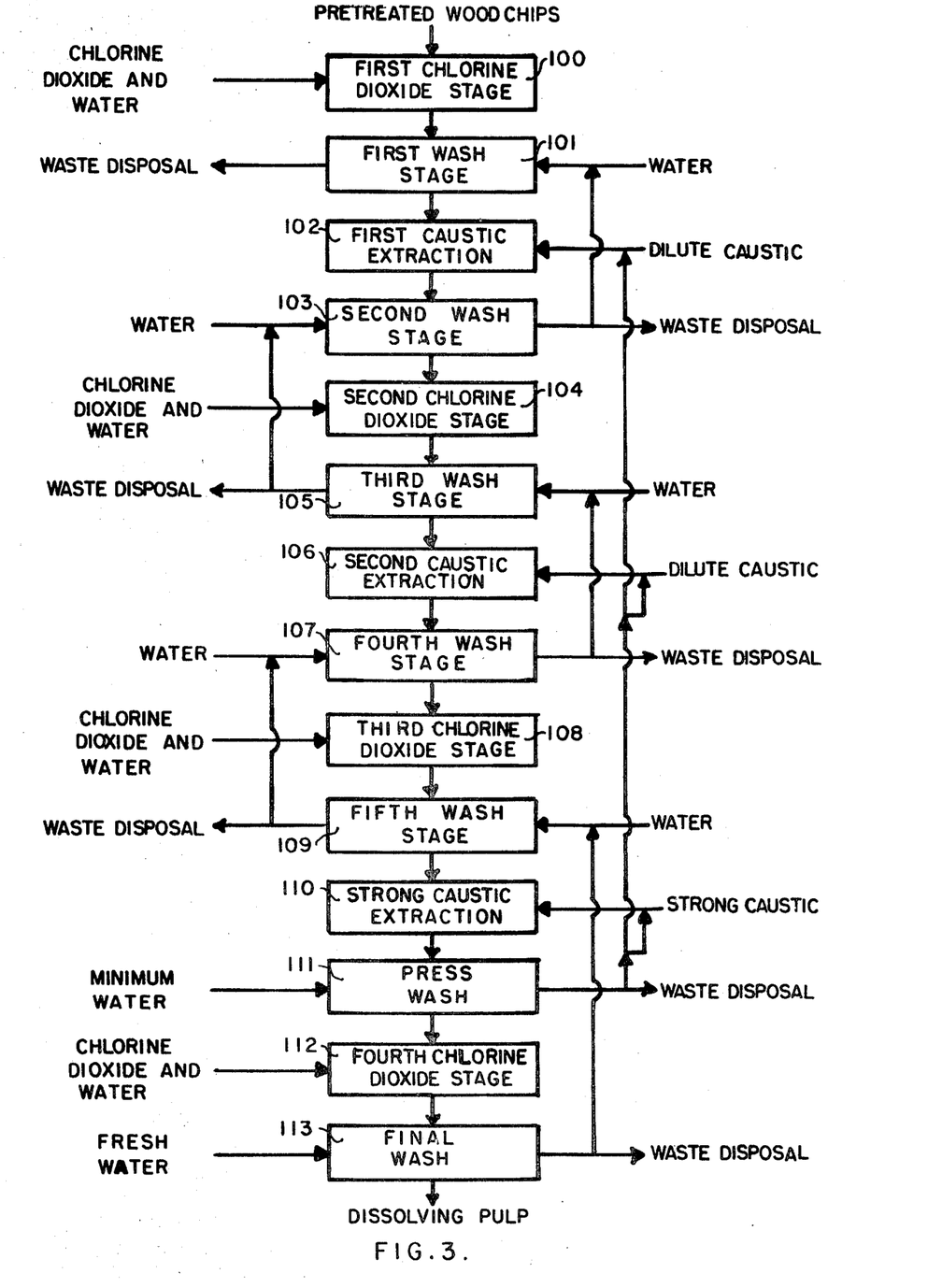

One of the most preferred embodiments of the invention is shown in FIG. 3 and includes the sequential steps of first lignin reaction treatment, dilute alkaline extraction, second lignin reaction treatment, dilute alkaline extraction, third lignin reaction treatment, strong alkaline extraction, and fourth lignin reaction treatment, with a water wash between each step, and having the first lignin reaction treatment preceded by acid prehydrolysis and a chemical-mechanical pretreatment. According to this preferred four-stage lignin reaction treatment, pretreated wood chips (e.g., pretreated by acid prehydrolysis, neutral sulfite prepulping, and mechanical defibration with appropriate intermediate washing stages) are passed from the first lignin reaction stage 100 into a first wash stage 101. Water to this stage may be at least partially made up from countercurrent water from a second wash stage. The neutralized pulp from the first wash stage is then passed into the first alkaline extraction 102, which employs a dilute alkali solution.

After the first alkaline extraction, the pulp is subjected to a second wash in stage 103, water from this stage likewise being partially fresh and partially furnished by countercurrent recycle from a third wash stage. From the second wash stage, the pulp is then passed into a second lignin reaction stage 104, after which the pulp is again washed in a third wash stage 105, to which at least a portion of the wash water may be supplied as effluent from a fourth wash stage. The pulp from the third wash stage is passed into a second alkaline extraction 106, which, like the first alkaline extraction is supplied with dilute alkali. After the second caustic extraction, the pulp is subjected to a fourth wash stage which again may utilize water from a fifth wash stage for at least a portion of the required wash water. Subsequent to the fourth wash, the pulp is subjected to a third lignin reaction stage 108 and then a fifth wash stage 109 supplied with partially fresh water and water from final washing in any desired proportions. From the fifth wash the pulp is passed to further alkaline extraction 110 supplied with strong alkali solution. This stage ensures that a large proportion of the hemicellulose will be extracted from the pulp to produce dissolving-grade pulp. From the strong caustic extraction the pulp is passed through a press-wash, which is more thoroughly described below with reference to the preferred embodiment shown in FIG. 4. After the press-wash 111, the pulp is subjected to a fourth and final lignin reaction stage 112 and then to a final wash 113. Completely fresh water is supplied to the final wash, and the washer effluent may be sent to waste disposal or passed countercurrently to the fifth wash stage and so on as above explained. Liquid effluent from the press-wash, which contains a substantial quantity of alkali, is also recycled to the strong alkaline extraction stage 110 and to the dilute alkaline extraction stages 106 and 102.

Figure 4:
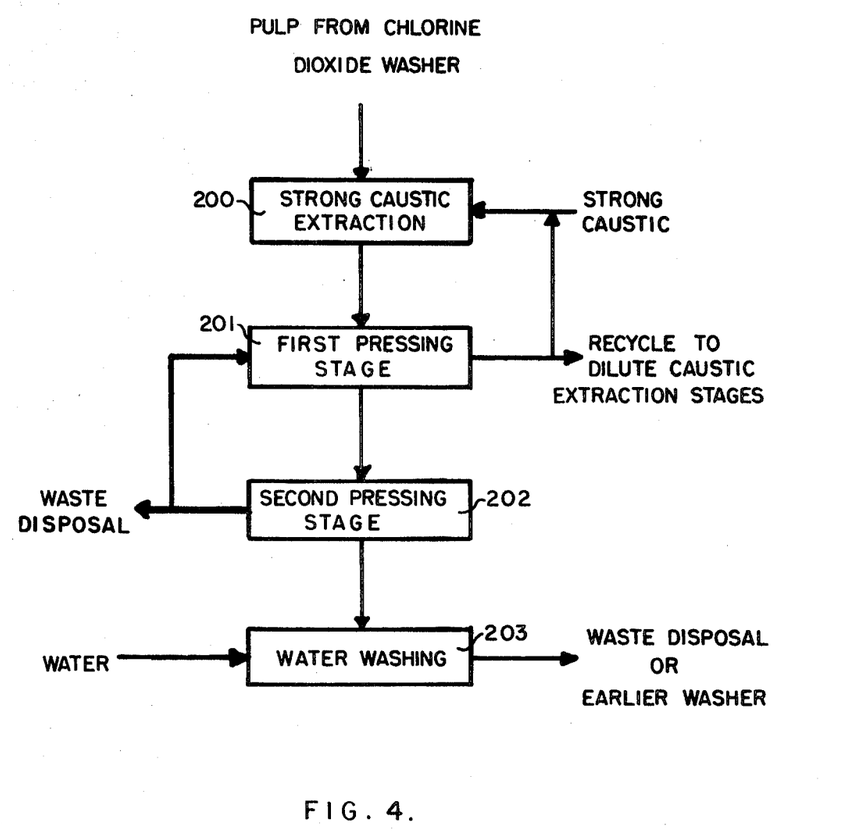

FIG. 4 discloses a preferred embodiment of a press-wash. Pulp from a lignin reaction stage washer is passed into strong extraction stage 200 and from there on to pressing stages 201 and 202. Water from pressing stage 201 is partially recycled to both strong alkaline extraction stage 200 and prior dilute alkaline extraction stages. Water from second pressing stage 202 is partially recycled to the first press, with the remainder being sent to waste disposal. Pulp from the pressing stages is then passed to a water washing stage 203.

The novel process of this invention is suitable for preparing a novel dissolving-grade pulp from any suitable fibrous vegetable matter containing lignin. As is necessary with all pulping processes, the vegetable matter should have extraneous materials removed before being subjected to the process. For example, in the case of wood, it must be debarked in a prior operation. In the following description, wood will be referred to as the fibrous vegetable material; however, it should be understood that the process of the invention is applicable to all fibrous vegetable materials.

Debarked wood, either hard, soft, or mixed hard and soft woods, may be converted into chips by a Carthage multiknife chipper or other equivalent apparatus. The chips should be approximately 15 to 75 millimeters in length, 10 to 40 millimeters in width and have a thickness of 0.5 to 20 millimeters. When chemical or chemical-mechanical pretreatment is used, it is preferred that chips have an approximate length and width as described and that the thickness be from about 2 to about 5 millimeters. Following chipping, prepared chips are then subjected to the prehydrolysis and pretreatment steps.

At least two methods are available for reducing the hemicellulose content of the final dissolving-grade pulp. First, the wood chips may be subjected to mild acid prehydrolysis prior to the preferred neutral sulfite pretreatment and mechanical defibration. Such a stage selectively hydrolyzes the hemicellulose so that it is more readily removed in subsequent stages. Second, the final extraction stage in the chlorine dioxide extraction sequence is changed from the relatively weak extraction used in producing a high yield bleach pulp (about 4 percent caustic applied, based on pulp at 12 percent consistency) to a much stronger alkaline extraction. Since the acid prehydrolysis stage without the strong alkali stage is not sufficient to remove the required amount of hemicellulose, the dissolving-pulp sequence includes either the strong alkali stage alone or both the prehydrolysis and strong alkali stages.

The acid prehydrolysis, when employed, is carried out by charging the wood to a digester and heating it in the presence of water, the acidity being entirely developed through reactions in the wood. In a preferred embodiment, water is added to obtain a ratio of about 4 pounds water per pound of wood, and the mixture is heated to about 340° F. and maintained at this temperature for about 60 minutes when hardwood chips are used as the raw material. Prehydrolysis is allowed to proceed only to the point where hemicelluloses are rendered soluble in subsequent treatments, but the cellulose is not allowed to be degraded or solubilized to an appreciable extent. The preferred embodiment produces a prehydrolysis yield of about 88 percent based on hardwood chips used. More generally, hardwood prehydrolysis is suitably carried out at a temperature of about 300° to about 280° F. for a time of about 10 to about 180 minutes; preferably, prehydrolysis is carried out at a temperature of about 330° to about 350° F. for a time of about 30 to about 90 minutes.

A mild prehydrolysis is as effective in ultimate pentosan (hemicellulose) removal as more severe process conditions; the mild conditions are preferred because of the resultant higher cellulose retention. Therefore, in cases where very low pentosan content is essential, the use of a mild water prehydrolysis in the overall sequence provides the ability to remove the required amount of pentosans, while maintaining high cellulose yield and most of the inherently high degree of polymerization.

The hydrolyzed fiber chips are next preferably fed to a pretreatment step which can be either mechanical, chemical or a combination of chemical and mechanical. In chemical pretreatment, the fiber chips are prepulped to a yield at least greater than 64 percent by weight but less than about 95 percent by weight, based upon the dry weight of the wood chips. In mechanical pretreatment, which may give higher yields than the 95 percent yield of chemical pretreatment, the vegetable fiber chips are subjected to a shredding, refining, or flaking operation, such as is well known in the art, e.g., by a Pallman knife ring flaker, which by slicing reduces conventionally sized chips to thin flakes while maintaining chip length and width, or a standard disc refiner, or the equivalent. As is also known, the chips may be subjected to water or steam treatment (in addition to acid prehydrolysis) prior to flaking or refining, either under vacuum or pressure. Following either flaking or refining the resulting fibers or fiber bundles should be as small as possible without significant damage to the fibers. The optimum size depends upon the flaking or refining equipment employed as well as on the wood species being treated. When chemical pretreatment is used, the vegetable fiber chips are subjected to a chemical treatment followed by a mechanical refining operation and then a water washing. The chemical pretreatment results in a yield of at least about 64 percent or greater in the case of hardwoods and may be a mild prepulping by a neutral sulfite, nitric acid, kraft or other known pulping process (e.g., bisulfite, acid sulfite, cold soda, soda, sodium xylene sulfonate, polysulfide). A more preferred chemical pretreatment is a mild neutral sulfite prepulping under particular conditions of chemical concentrations; the heating and cooking cycles are defined infra. After either the chemical or mechanical pretreatment, refining step, and water wash, a dewatering step may be necessary prior to subjecting the pretreated fibers to the novel pulping process of this invention.

The refining step following the chemical pretreatment may be performed by a standard disc refiner or other equivalent apparatus and conducted to yield minimum particle size without significant fiber damage. While it is desirable to refine the chemically pretreated chips sufficiently so that subsequent washing can be more efficiently achieved and reactions with chlorine dioxide can proceed more uniformly, and result in a more uniform, shive-free pulp, it is clear that extensive refining requires considerable power consumption. A primary objective therefore is to achieve such refining while still limiting power consumption. In accordance with a highly preferred embodiment of this invention, this objective is successfully achieved by refining under elevated temperature, preferably in a pressurized refiner. A temperature of from about 150° F. to about 400° F. at a corresponding pressure of from about 15 pounds per square inch absolute to about 245 pounds per square inch absolute is suitable; a temperature of from about 212° F. to about 300° F. at a corresponding pressure from about 15 pounds per square inch absolute to about 70 pounds per square inch absolute is preferred. Temperatures up to about 212° F. can be achieved in a conventional disc refiner. Higher preferred temperatures require a pressurized refiner. A power input of from about 0.2 to about 10 horsepower-days per ton of dry pretreated chips is suitable; a power input of from about 0.5 to about 5 horsepower-days per ton of dry pretreated chips is preferred. Thus, there is a pronounced saving in the power requirement for pressure refining as compared with conventional refining. Generally, there is no need to use higher power inputs with the pressurized refiner since the resultant refined material is finely divided and well suited for washing and for reacting efficiently and rapidly in the chlorine dioxide sequence of this invention.

It has been found that when using a chemical pretreatment in preference to only a mechanical pretreatment, the amount of fines produced in the refining is reduced, the optimum diameter of the fiber bundles produced is reduced, the energy input to the refining operation is reduced, the quantity of lignin reaction agent necessary for pulping to a desired brightness is reduced, the quality of the final pulp from the novel process is improved, and the overall yield of the pulp from the final process is in general increased.

Following acid prehydrolysis and pretreatment, mechanical and/or chemical, as the case may be, the pulp enters the first lignin reaction step. In this step, the shredded mass of fiber bundles resulting from the pretreatment has a consistency of from about 5 percent to about 50 percent by weight, based on the total weight of shredded mass and water. Chlorine dioxide, if used as an aqueous solution, may be fed as an approximately 1 percent by weight aqueous solution, and depending upon the desired concentration of chlorine dioxide, which is defined infra, additional water may be added to adjust the mixture to the desired consistency. If gaseous chlorine dioxide is used, an inert diluent such as air may be employed to prevent explosion hazards. A mixture of chlorine dioxide and chlorine may be employed, with the chlorine being less than about 30 percent by weight of the total chlorine dioxide requirement on an equivalent oxidant basis.

Any conventional treating tower such as is well known in the art may be used for the liquid phase chlorine dioxide treatment stage, and heat may be added, if and as necessary. Also, additional heat may be supplied to reduce the time of contact between the shredded mass and the chlorine dioxide, which time is from about 10 minutes to about 2 hours depending upon the consistency, the temperature, and the yield of product resulting from the pretreatment step. In general, the shredded mass of fibers is permitted to remain in contact with the chlorine dioxide until the chlorine dioxide charged is substantially consumed. The pH of this system at the beginning may vary from about 4.0 to about 8.0, and upon consumption of the chlorine dioxide, the pH of the treated solution will vary from about 0.5 to about 3.0. Following the chlorine dioxide treatment, the resulting mass is then water washed in a conventional vacuum drum washer or the equivalent.

Following the first water washing, and when the material has a substantially neutral pH, the washed material is subjected to a first dilute alkaline extraction in a conventional treating tower such as is well known in the art. In the alkaline extraction, any water soluble caustic may be employed, e.g. sodium hydroxide, potassium hydroxide, ammonium hydroxide, sodium carbonate, ammonia gas or other or mixtures of these or others; however, an aqueous solution of sodium hydroxide is preferred. In the extraction, the alkali application should be approximately 4 percent based on the oven dry weight of the fibrous material, and sufficient water may be added or removed to prepare an aqueous fiber mass having a consistency of from about 5 percent to about 50 percent by weight based on the total weight of shredded mass present and water. The alkaline extraction should be continued for at least about one-half hour at a temperature of from about 50° C. to about 75° C., a preferred temperature being about 65° C. Following alkaline extraction, the alkali extracted material is subjected to another water washing under substantially the same conditions as the first water wash to remove extracted materials and residual chemicals.

The second lignin reaction may be carried out in a conventional treating tower such as described for the first lignin reaction treatment with the desired consistency of material within the tower being substantially the same for the second lignin reaction as for the first. Either gaseous chlorine dioxide or an aqueous solution, approximately 1 percent by weight, may be fed to this second treatment stage. In this stage the pH is initially from about 4.0 to about 8.0 and finally ends at about 2.0. The lignin reaction is permitted to continue until substantially all the chlorine dioxide charged to the treating stage is consumed. The temperature for the second chlorine dioxide treatment is adjusted to from about 40° C. to about 60° C. to keep contact times to a minimum of from about 30 minutes to about 4 hours in order to consume the chlorine dioxide charged. Following the second lignin reaction, the treated material is subjected to a third water washing under substantially the same conditions as the first and second water washings. After the third water wash, a second dilute alkaline extraction is conducted, followed by a water wash under substantially the same conditions as the first alkaline extraction and wash. The washed material at this stage in the process may be screened, if desired, to remove any shives or fiber bundles which may remain, these being discarded or returned to the first chlorine dioxide treatment stage for recycle.

The treated material, whether screened or not, is then subjected to a third lignin reaction under the same conditions of consistency as the first and second lignin reaction stages for a period of from about 2 hours to about 6 hours, depending upon the desired brightness of product produced. The temperature for this third lignin reaction treatment stage is from about 40° C. to about 80° C. Next, the treated material is subjected to a fifth water wash under the same conditions as the preceding water washing, followed by a strong alkaline extraction.

Strong alkaline extraction, either alone or in conjunction with a mild prehydrolysis, is essential for pentosan removal. The amount of alkali required, and therefore its cost, is significant. For example, an extraction with 8 percent alkaline solution at 12 percent pulp consistency requires the application of about 1170 pounds of alkali per ton of pulp on a dry basis. Therefore, it is important to reduce this value to a minimum both through use of minimum quantities of applied alkali and through recycle of extracted liquor. Strong alkaline extraction is carried out at about 10 percent consistency, and maximum pentosan removal is accomplished with about 50 to about 60 grams per liter of alkali. Stronger alkali is not required, but it is important to maintain the 50 to 60 grams per liter level in the case of hardwoods. The degree of polymerization level of the alpha cellulose is not adversely affected by the alkali. When prehydrolysis is not employed, maintenance of the desired minimum alkali concentration is most critical. An intermediate pentosan level is reached at a much lower alkali application level when prehydrolysis is employed. If higher levels of pentosan content (4 to 5 percent) can be tolerated, they can be achieved by either approach; the final choice depends on the relative economics of a prehydrolysis compared with the higher alkali requirement when no prehydrolysis is employed. Since relatively little alkali is actually consumed in the extraction, recycle may account for about 50 percent of the total alkali requirement or more. If a low pentosan content must be maintained, prehydrolysis followed by alkaline extraction with little recycle is required. Regardless of the number of lignin reaction stages used, the strong alkaline extraction is used either before or after the final lignin reaction stage, with the before case being preferred.

Following the strong alkaline extraction, the pulp is subjected to a press-water or its equivalent, final lignin reaction treatment, and final wash under the conditions above described.

The total concentration of chlorine dioxide used in the multistage process, whether two, three or more chlorine dioxide stages, is dependent upon the yield of product obtained from the pretreatment step. In general, the total chlorine dioxide consumed in the multiple lignin reaction stages, regardless of the number of stages used, is from about 1.0 to about 15.0 percent by weight based on the total dry weight of fibrous material being fed to the pretreatment stage. It has been found and is preferred that the total concentration of chlorine dioxide used is from about 4.0 percent to about 13.0 percent by weight, based upon the total weight of dry fibrous material being fed to the pretreatment stage.

The amount of chlorine dioxide fed to each lignin reaction stage is dependent upon the number of stages used and on the pretreatment yield. For any given total amount of chlorine dioxide to be used, it has been found that approximately two times the amount used in the last stage should be fed to the stage preceding the last and two times the amount used in the preceding stage fed to the next preceding stage, and so on. For example, in a three stage process, this means that approximately four-sevenths of the total chlorine dioxide will be fed to the first stage, approximately two-sevenths of the total chlorine dioxide will be fed to the second stage, and approximately one-seventh to the third stage. By comparison, in a four stage treatment the consecutive amounts employed are eight-fifteenths, four-fifteenths, two-fifteenths, and one-fifteenth.

As mentioned previously, the preferred pretreatment for the process of this invention is a chemical pretreatment, and of the chemical pretreatments available such as kraft, bisulfite, neutral sulfite, nitric acid, etc., a neutral sulfite pretreatment is preferred. And, among the neutral sulfite pretreatments available, a sodium based neutral sulfite pretreatment is preferred. As well known in the art, a standard neutral sulfite pulping treatment includes cooking fibrous vegetable material for a period of about 10 to about 15 minutes at about 350° F. in a solution containing approximately 10 percent sodium sulfite and approximately 3 percent sodium carbonate, chemical charges being based on the wood weight charged to the process. Although this standard neutral sulfite pretreatment has advantages, in the process of this invention it is even more preferred that a specific and novel neutral sulfite pretreatment be used. This novel chemical pretreatment includes preparing an aqueous solution with a concentration of from about 5 to about 30 percent sodium sulfite and from about 3 to about 25 percent sodium carbonate (all concentrations based on the weight of wood present) to provide a sodium sulfite to sodium carbonate ratio of about 1.2 or greater and using the solution to chemically pretreat wood chips with or without a prior prehydrolysis step. More preferred concentrations are from about 7 to about 20 percent sodium sulfite and from about 5 to about 18 percent sodium carbonate, all percentages being based upon the dry weight of the vegetable matter. A preferred sodium sulfite to sodium carbonate ratio for hardwoods is from about 1.2 to about 1.5. The time-temperature relationship employed is designed to give adequate impregnation of liquor into chips prior to reaching a temperature of about 300° F. This relationship is dependent upon wood species and chip size, as well as previous chip history. When a chemical pretreatment is performed in accordance with the described recipe, higher final yields and higher quality product are obtained as compared with other mechanical or chemical pretreatments.

The dissolving pulp of the present invention is chemically unique in that it has a higher degree of polymerization and therefore greater strength potential than dissolving-grade pulp conventionally produced from the same wood. For example, average cellulose molecule size is increased greatly. While the degree of polymerization (TAPPI Method T-230-Su-65) of conventional dissolving pulps is less than about 1,000, the dissolving pulp of the present invention is above 1,000, preferably above 1,500 and frequently above 2,000, and may extend up to, for example 5,000. Also, the pulp of this invention has an alpha cellulose content (TAPPI Method T-203-OS-61) which is generally greater than 90 percent, frequently greater than 94 percent, and occasionally greater than 98 percent. The copper number (TAPPI Method T-215-m-50) of the pulp is generally less than 2.0, frequently less than 1.0, and occasionally less than 0.2. The resin content (TAPPI Method T-204-m-54) is generally less than 0.15 percent, frequently less than 0.1 percent, and occasionally less than 0.05 percent. Prior art processes give final overall yields, based on wood used, of 35 to 40 percent, generally closer to 35 percent. The present invention, by comparison, obtains yields that can be greater than 40 percent, frequently greater than 45 percent, and occasionally greater than 50 percent, depending upon the process conditions utilized and quality of pulp required.

Dissolving pulps are used in the alkaline viscose process and the acidic acetate and nitrate processes to make fibers, yarn, film or lacquer. In the viscose, acetate, and nitrate processes it is desirable to have a high alpha cellulose content and a high degree of polymerization for the production of high tenacity yarns. Hemicelluloses have been found to cause decreased reactivity in both the acetate and the viscose processes. In the acid acetate process, hemicellulose can cause discoloration and haze. This also indicates the need for a high alpha cellulose content. A low resin content is desired in dissolving pulps since resin can lead to clogging and filtering problems as well as haze or undesirable color in the final product. Since pulps with high carbonyl content are less stable to aging, a low carbonyl content is desired. Inasmuch as the pulp produced by the process of the present invention has a higher degree of polymerization, a higher alpha cellulose content, a lower resin content, a lower carbonyl content, and a higher yield than conventionally produced dissolving-grade pulps from the same wood mixture, it is well suited to use in these processes.

The novel process of this invention may be understood better by reference to the following examples; however, it should be understood that these examples are intended to be descriptive rather than restrictive.

EXAMPLE I

Southern hardwood chips are prepared by chipping debarked logs in a multiblade chipper. These chips are then subjected to a mild prehydrolysis by heating with sufficient water to give a final ratio of water to dry wood of about four to one on a weight basis. The temperature of the wood-water mass is raised to 340° F. and held at this temperature for one hour. This treatment renders most of the pentosans soluble in subsequent stages, while maintaining most of the inherent cellulose yield and degree of polymerization. No acid other than that generated from wood reactions is present.

The prehydrolyzed chips are dewatered and allowed to soak in fresh water so the acidic material can diffuse out of the chips. The chips are then pretreated chemically with a solution containing 12 percent sodium sulfite and 10 percent sodium carbonate, both percentages based on the incoming weight of dry wood prior to prehydrolysis. Enough water is added with these chemicals to give a water to wood ratio of about four to one. Following an impregnation time of 30 minutes, the temperature is raised to 335° F. and the pretreatment is allowed to continue until the pretreatment yield reaches 80 percent.

Following chemical pretreatment, the pressure is relieved (with accompanying decrease in temperature), free liquid is drained off, and the pretreated softened chips are passed through a disc refiner operating at an elevated temperature and pressure. A refiner power input of 10 horsepower-days per ton of pretreated material is used.

The defibered material is washed and pressed to the desired solids level. A maximum of washing is used to minimize the carryover of chemical to the first chlorine dioxide stage.

The washed, dewatered pulp is mixed with a chlorine dioxide solution until all chlorine dioxide is consumed. With an 80 percent pretreatment yield, reaction conditions are 4 percent chlorine dioxide based on original dry wood, with the reaction proceeding for two hours at ambient temperature. The partially reacted pulp leaving this stage is washed, 4 percent sodium hydroxide based on entering fiber is added with sufficient water to give a pulp consistency of 12 percent, and a one hour extraction is carried out at 60° C. The extracted pulp is thoroughly water washed and reacted in a second chlorine dioxide stage for three hours at 12 percent consistency and 40° C., with an application of 3 percent chlorine dioxide based on starting dry wood.

The further delignified material is washed thoroughly and extracted for one hour at ambient temperature at 12 percent consistency in a solution containing 60 grams of sodium hydroxide per liter. This extraction removes partially reacted lignin as well as most of the pentosans remaining with the pulp.

The purified pulp, still containing small amounts of lignin, is thoroughly washed until neutral and is then reacted in a final chlorine dioxide stage for five hours at 70° C. and 12 percent consistency. One percent chlorine dioxide on an original wood basis is applied in this stage, with essentially complete consumption occurring during the five hour reaction.

Following final washing, a high-grade dissolving pulp is obtained in a yield of 50 percent, having a pulp pentosan content of one percent (TAPPI Method T-223-ts-63), a viscosity average carbohydrate degree of polymerization of 1,800 (TAPPI Method T-230-su-66), an alpha cellulose content of 96 percent (TAPPI Method T-203-os-61), a copper content of 0.20 (TAPPI Method T-215-m-50), and a resin content of 0.06 percent (TAPPI Method T-204-m-54).

resultant washed pulps were analyzed for yields, degree of polymerization, and pentosan (hemicellulose) content, with cellulose yield being calculated by difference. The results were as follows:

|  | Conventional Dissolving Pulp | Prehydrolysis Strong Caustic Dissolving Pulp | Strong Caustic Dissolving Pulp |
|---|---|---|---|
| Yield, % of wood | 35–40 | 51 | 52 |
| Pentosans, % of pulp (1) | ~2 | 1.2 | 3.6 |
| Cellulose yield, % of wood | ~37 | 50 | 50 |
| Degree of Polymerization (2) | ~900 | 1,680 | 2,300 |

(1) Determined by TAPPI Method T-223-ts-63.

(2) Determined by TAPPI Method T-230-su-66 (pipet method).

The above comparison shows that selective pentosan removal without excessive cellulose degradation can be achieved by optimizing hydrolysis conditions.

EXAMPLE IV

Five prehydrolysis cooks were carried out under increasingly severe conditions, again using a hardwood chip raw material. In all cases, a water to wood ratio of 4.0 was employed, with a 15 minute digester rise time from ambient to 340° F. The severity was varied by varying the reaction time at 340° C. Dissolving pulps were prepared from these prehydrolyzed materials according to the procedure of Example I, the steps including final strong caustic extraction (8 percent solution). The resulting pulps were analyzed for yield, pentosan content, and acetyl content. These values, with assumed typical values for uronic acid and mannan contents, allowed to the calculation of cellulose yield by difference. Pulp cuene viscosity was measured, and the values converted to approximate average degree of polymerization. These results were as follows:

| Prehydrolysis cook number: | Prehydrolysis time at 340° F., minutes | Dissolving pulp yield, percent | Pentosans percent of wood | Cellulose percent of wood | Cuene viscosity, centipoises | Approximate degree of polymerization |
|---|---|---|---|---|---|---|
| 1 | 30 | 53.5 | 1.18 | 48.0 | 19 | 1,450 |
| 2 | 60 | 50.9 | 0.63 | 47.4 | 21 | 1,500 |
| 3 | 90 | 42.9 | 0.91 | 40.3 | 19 | 1,450 |
| 4 | 120 | 40.9 | 0.88 | 39.1 | 23 | 1,550 |
| 5 | 150 | 40.2 | 0.69 | 38.4 | 19 | 1,450 |
| No Prehydrolysis | 9 | 54.6 | 2.0 | 48.0 | 87 | 2,150 |

EXAMPLE II

The above process is repeated without the prehydrolysis stage to yield a dissolving pulp of even higher yield (53 percent) and degree of polymerization (2,300) but having somewhat higher pentosan content (three percent).

EXAMPLE III

The following tests were conducted utilizing a mixture of certain hardwood chips containing approximately ⅓ oak, ⅓ gum, and ⅓ yellow poplar. Acid prehydrolysis was effected by charging the wood to a digester, adding water to obtain a ratio of 4 lbs. water per pound of wood, heating the mixture to 340° F. and maintaining this temperature for 60 minutes. This produced a prehydrolysis yield of 88 percent. A neutral sulfite treatment was then carried out, followed by mechanical refining in an 8-inch laboratory disc refiner and chlorine dioxide-caustic extraction sequence. Strong caustic extraction was carried out at 12 percent consistency in an 8 percent solution of sodium hydroxide. A second pulp was prepared through the same sequence but without the prehydrolysis stage. The The above table shows that mild prehydrolysis is as effective in ultimate pentosan removal as more severe conditions which result in a sharp drop in cellulose content. Cellulose degree of polymerization is little affected by the severity of prehydrolysis. Mild prehydrolysis does not significantly lower cellulose yield, does aid in pentosan removal, and results in a significant decrease in pulp degree of polymerization. Therefore, in cases where low pentosan content is essential, the use of a mild water prehydrolysis provides the ability to remove the required amount of pentosans, while maintaining a high cellulose yield and most of the inherently high degree of polymerization.

EXAMPLE V

Figure 5:
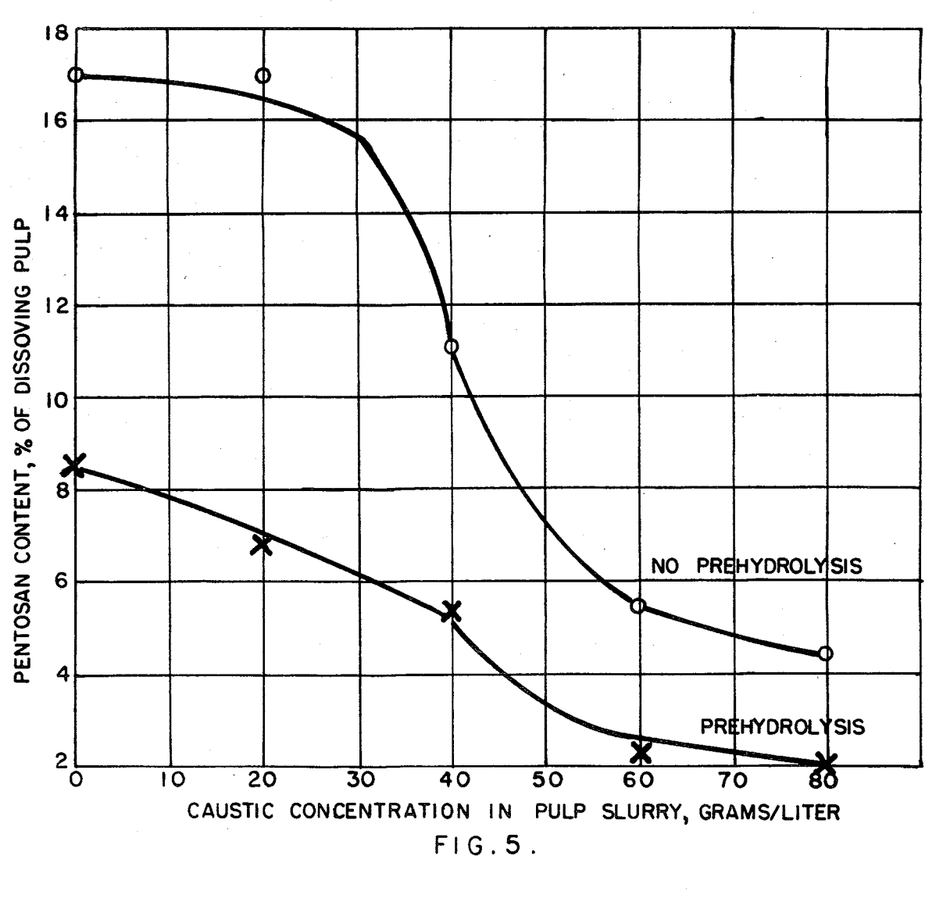
Figure 6:
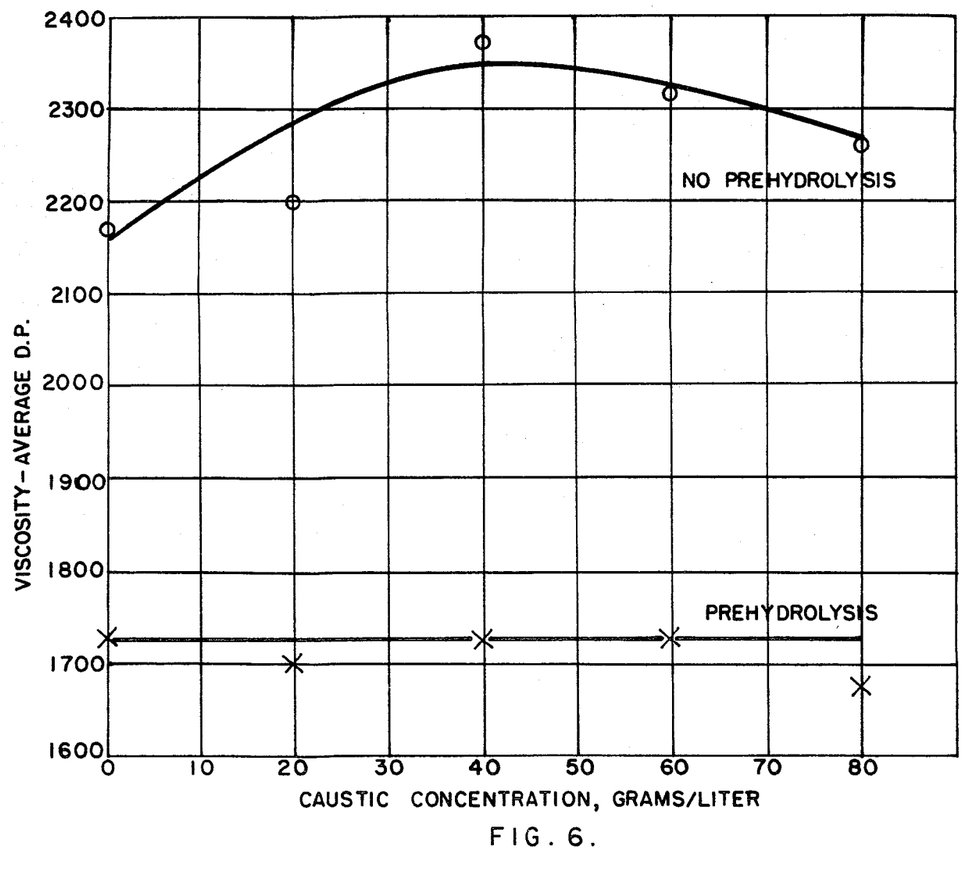

A series of strong sodium hydroxide extractions were carried out at 12 percent pulp consistency using varying levels of alkali application. The pulp used was prepared by the chlorine dioxide pulping sequence as described in Example I, with and without the mild prehydrolysis stage. FIG. 5 of the drawings shows the effect of amount of caustic applied on pulp pentosan content. FIG. 6 shows the corresponding degree of polymerization changes.

As evident from FIG. 5, maximum pentosan removal is accomplished with about 60 grams per liter of caustic. Stronger caustic is not required, but it is important to maintain approximately the 60 grams per liter level. FIG. 6 of the drawings demonstrates that degree of polymerization was not adversely affected by the strong caustic extraction. The initial increase in the no-prehydrolysis case can be attributed to the rather large amount of low degree of polymerization pentosans being removed.

EXAMPLE VII

Alkali recycle was practiced using the process of Example I by extracting one batch of pulp with strong sodium hydroxide, at 10 percent consistency, squeezing out about ½ of the extraction liquor (to a pulp consistency of about 18 percent), adding enough fresh sodium hydroxide to give the desired strength, extracting a second pulp sample, and repeating this procedure. This amounted to a fresh makeup of about 50 percent of the total alkali requirement. Following alkali extraction and thorough washing, pulp pentosan content was determined. The results are tabulated below for both the prehydrolysis and no-prehydrolysis cases:

| Extraction Number | Pentosan Content, % of Pulp | |
|---|---|---|
| | No-Prehydrolysis | Prehydrolysis |
| 1 | 4.9 | 3.1 |
| 2 | 6.5 | 3.3 |
| 3 | 5.8 | 5.2 |
| 4 | 6.0 | 5.5 |
| 5 | 5.7 | 4.7 |
| 6 | 5.1 | 4.1 |

From the above data, it is apparent that a significant amount of recycle can be used and that there is less effect of recycle when dealing with the non-prehydrolyzed pulps. If a low pentosan content must be maintained, prehydrolysis followed by extraction with little recycle is required.

EXAMPLE VIII

A sodium based neutral sulfite pretreatment was carried out as follows. Southern hardwood chips (approximately ⅓ oak, ⅓ yellow poplar, and ⅓ gum) at approximately 50 percent moisture were heated at a 3:1 ratio of liquid to dry wood in a solution containing 10 percent sodium carbonate and 12 percent sodium sulfite, both based on the dry wood weight being treated. The following time-temperature cycle was employed, using a laboratory digester with forced liquor circulation and indirect heating:

30 minutes from ambient temperature to 273° F.,
60 minutes hold at 273° F.,
30 minutes from 273° F. to 335° F.,
55 minutes hold at 335° F.

The pretreated wood chips thus produced were at a yield of 80.5 percent, based on the starting dry wood. These softened chips, still saturated with the spent pretreatment liquor at a pH of 9.5, were then refined in several ways using a small laboratory refiner (sample 1), a pressurized refiner (samples 2–5) and a conventional commercial double disc refiner (samples 6–7). The refining conditions used are summarized below:

Summary of Refining Conditions

| Sample Number | Refiner Used | Refining Power Used, HPD/T | Refining Temperature |
|---|---|---|---|
| 1 | 8" laboratory disc | Very low | 180° F. |
| 2 | pressurized refiner | 1.5 | 250° F. |
| 3 | pressurized refiner | 1.5 | 250° F. |
| 4 | pressurized refiner | 1.5 | 300° F. |
| 5 | pressurized refiner | 1.5 | 340° F. |
| 6 | conventional disc | 5.1 | 180° F. |
| 7 | conventional disc | 15.7 | 180° F. |

The pulps refined in the two commercial sized refiners of samples 2 to 7 were then characterized by a standard classification (TAPPI Method T233 su-64). These data are shown below:

CLASSIFICATION OF REFINED PRETREATED HARDWOODS

| Sample | Percent retained, 14 mesh | Percent retained, 28 mesh | Percent retained, 48 mesh | Percent retained, 100 mesh | Percent retained, 200 mesh | Percent passing, 200 mesh |
|---|---|---|---|---|---|---|
| 2 | 4.9 | 20.9 | 36.6 | 11.9 | 4.9 | 20.8 |
| 3 | 5.5 | 18.1 | 38.4 | 12.5 | 5.2 | 20.3 |
| 4 | 0.2 | 26.2 | 42.8 | 11.9 | 4.5 | 14.4 |
| 5 | 0 | 36.1 | 33.2 | 10.9 | 3.4 | 16.4 |
| 6 | 12.0 | 29.6 | 29.6 | 9.4 | 3.5 | 15.9 |
| 7 | 0.7 | 30.0 | 30.9 | 10.7 | 4.0 | 23.7 |

A major point shown by this table (in conjunction with the previous table) is that at even a higher power input (sample 6), the conventional disc refiner leaves much more coarse material (first two classification fractions) than does the pressurized refiner at about one-third the power input (samples 2 and 3).

What is claimed is:

1. A process for producing a dissolving-grade pulp in high yield and having a high degree of polymerization by removing lignin and hemicellulose from vegetable matter comprising, in combination, the steps of:
   a. subjecting said vegetable matter to mechanical refining at a temperature of from about 150° F. to about 400° F. and a pressure of from about 15 pounds per square inch absolute to about 245 pounds per square inch absolute;
   b. reacting said vegetable matter with a compound selected from the group consisting of chlorine dioxide and a mixture of chlorine dioxide and chlorine; and
   c. extracting the reaction products and said hemicellulose content of said vegetable matter with a strong alkali solution at room temperature.

2. The process of claim 1 wherein said vegetable matter is pretreated prior to said refining to attain a yield of about 64 percent to about 100 percent by weight, based upon the dry weight of said vegetable matter.

3. The process of claim 1 wherein said pretreating is substantially a chemical pretreatment.

4. The process of claim 1 wherein said alkali is sodium hydroxide.

5. The process of claim 1 wherein Step "c" of claim 1 is preceded stepwise by a dilute alkaline extraction, a lignin reaction treatment, and said Step "c" is followed by a lignin reaction treatment.

6. The process of claim 1 wherein said refining is conducted at a temperature of from about 212° F. to about 300° F. and a pressure of from about 15 pounds per square inch absolute to about 70 pounds per square inch absolute.

7. The process of claim 1 wherein said refining consumes a power input of from about 0.2 to about 10 horsepower-days per ton of dry vegetable matter.

8. The process of claim 1 wherein said refining consumes a power input of from about 0.5 to about 5 horsepower-days per ton of dry vegetable matter.

9. The process of claim 1 wherein the pretreatment is a neutral sulfite pretreatment.

10. The process of claim 1 including a prehydrolysis step and a chemical pretreatment step before said refining.

* * * * *